(12) United States Patent
Tada et al.

(10) Patent No.: US 9,254,610 B2
(45) Date of Patent: Feb. 9, 2016

(54) CONNECTOR FIXING STRUCTURE AND METHOD OF MANUFACTURING THE SAME

(71) Applicant: JAPAN AVIATION ELECTRONICS INDUSTRY, LIMITED, Tokyo (JP)

(72) Inventors: Takashi Tada, Tokyo (JP); Akihiro Matsunaga, Tokyo (JP); Masayuki Nishikata, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 73 days.

(21) Appl. No.: 14/287,481

(22) Filed: May 27, 2014

(65) Prior Publication Data
US 2015/0031243 A1    Jan. 29, 2015

(30) Foreign Application Priority Data
Jul. 24, 2013   (JP) ................................. 2013-153639

(51) Int. Cl.
*H01R 13/52* (2006.01)
*B29C 65/16* (2006.01)
*H01R 13/74* (2006.01)
*H01R 13/46* (2006.01)

(52) U.S. Cl.
CPC ............... *B29C 65/16* (2013.01); *H01R 13/46* (2013.01); *H01R 13/5202* (2013.01); *H01R 13/74* (2013.01); *H01R 13/5216* (2013.01)

(58) Field of Classification Search
CPC ...................................................... H01R 13/46
USPC ........................................ 439/669, 668, 76.1
See application file for complete search history.

(56) References Cited

U.S. PATENT DOCUMENTS

| 2010/0257736 A1* | 10/2010 | Morita | B41J 2/14024 |
| | | | 29/890.142 |
| 2012/0315779 A1* | 12/2012 | Yudate | H01R 12/724 |
| | | | 439/271 |

FOREIGN PATENT DOCUMENTS

JP          5155492 B2    3/2013

* cited by examiner

*Primary Examiner* — Tulsidas C Patel
*Assistant Examiner* — Marcus Harcum
(74) *Attorney, Agent, or Firm* — Collard & Roe, P.C.

(57) ABSTRACT

A connector fixing structure comprises a housing integrally formed with a tubular resin housing-side insertion opening member protruding inward and a receptacle connector provided in the housing and joined to the housing-side insertion opening member. The receptacle connector has a connector-side insertion opening member having a shape corresponding to that of the housing-side insertion opening member and a welding portion provided to the connector-side insertion opening member and combined with the housing-side insertion opening member. The housing-side insertion opening member and the connector-side insertion opening member are welded together by melting the welding portion over its entire circumference.

12 Claims, 9 Drawing Sheets

CONNECTOR FIXING STRUCTURE AND METHOD OF MANUFACTURING THE SAME

This application is based upon and claims the benefit of priority from Japanese Patent Application No. 2013-153639, filed on Jul. 24, 2013, the disclosure of which is incorporated herein in its entirety by reference.

TECHNICAL FIELD

This invention relates to a connector fixing structure and a method of manufacturing the same.

BACKGROUND ART

Conventionally, as a connector having a waterproof function, there is known a structure in which an insertion opening for inserting a mating connector therethrough is covered with a seal member over its entire circumference.

As such a structure, there is known a structure described in, for example, Japanese Patent (JP-B) No. 5155492 (hereinafter referred to as "Patent Document 1").

Figure 18:
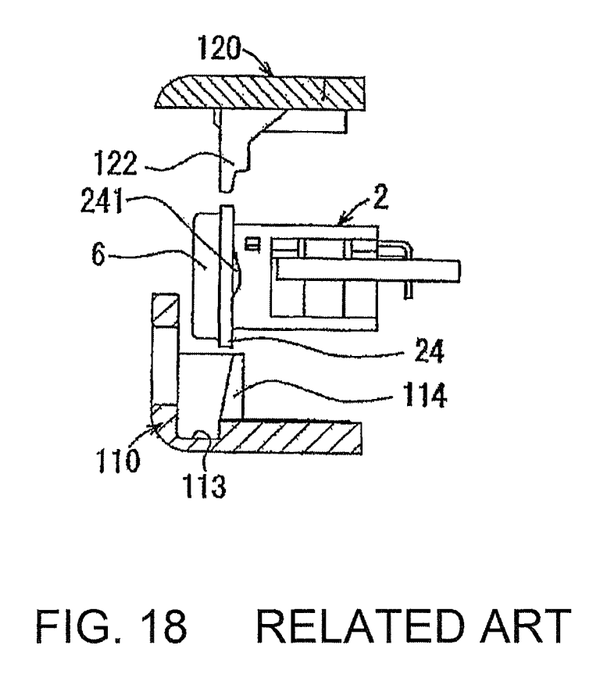
FIG. 18 is a diagram showing a related art connector.

Specifically, in the structure of Patent Document 1, as shown in FIG. 18, a housing 2 of a connector has a generally rectangular annular protrusion 24 at its front end and a generally rectangular annular seal member 6 is welded to the housing 2 at its front end including the protrusion 24. By firmly pressing the seal member 6 against a housing-side surface of a bottom case 110 in a sealed manner, it is possible to prevent water from entering between the bottom case 110 and the seal member 6.

More specifically, in the structure of Patent Document 1, the protrusion 24 is caused to slide downward on inclined surfaces of a pair of guide portions 114 of the bottom case 110 to thereby place the protrusion 24 and the seal member 6 in a receiving recess 113 of the bottom case 110 and then a pair of wedge portions 122 of a top case 120 are respectively inserted between a pair of projections 241 of the protrusion 24 and the guide portions 114, thereby pushing the projections 241 of the protrusion 24 toward the housing-side surface of the bottom case 110 so that the seal member 6 is firmly pressed against the housing-side surface of the bottom case 110.

SUMMARY OF THE INVENTION

Problem to be Solved by the Invention

However, in the structure of Patent Document 1, since the seal member 6 and the structure for firmly pressing it against the bottom case 110 are essential, it is difficult to reduce the number of components and thus to reduce the size and further the assembly becomes complicated, resulting in high cost.

That is, the structure of Patent Document 1 is complicated because it has the guide portions 114 with the inclined surfaces, the wedge portions 122, and the projections 241 in order to firmly press the seal member 6 against the bottom case 110 in a sealed manner. Thus, it is difficult to reduce the size of this structure and the assembly thereof is complicated, leading to an increase in cost.

Since a reduction in the size of a waterproof structure is essential particularly for a connector of a small-sized electronic device typified by a mobile telephone or a smartphone, there has been a problem that it is difficult to employ a structure of providing a seal member for such a connector.

This invention has been made in order to improve such a problem and it is an object of this invention to provide a connector fixing structure which is capable of preventing the entry of water with a simpler structure than conventional ones.

Means for Solving the Problem

In order to solve the problem mentioned above, as an aspect of the present invention, a connector fixing structure comprising: a housing integrally formed with a tubular resin housing-side insertion opening member protruding inward; and a connector provided in the housing and joined to the housing-side insertion opening member, wherein the connector comprises: a connector-side insertion opening member having a shape corresponding to that of the housing-side insertion opening member; and a resin welding portion provided to the connector-side insertion opening member and combined with the housing-side insertion opening member, and wherein the housing-side insertion opening member and the connector-side insertion opening member are welded together by melting the welding portion over its entire circumference is provided.

The housing-side insertion opening member may have a housing-side through hole which is opened through to the outside of the housing and into which a mating connector is adapted to be inserted.

It is preferable that: the welding portion is heated and melted by irradiation of heating laser light; the housing is made of a resin that transmits the heating laser light; and at least the welding portion of the connector is made of a resin that absorbs the heating laser light.

The housing-side insertion opening member may be such that its thickness in a height direction is smaller than its thickness in a width direction.

The housing-side through hole may have a circular front shape and the housing-side insertion opening member has an oval front shape.

The connector-side insertion opening member may be such that its thickness in a height direction is smaller than its thickness in a width direction. In this case, it is preferable that: the connector-side insertion opening member has a connector-side through hole into which the mating connector is adapted to be inserted; and the connector-side through hole a circular front shape and the connector-side insertion opening member has an oval front shape.

It is preferable that: the housing-side insertion opening member has at its end a joining portion having a concave shape; and the welding portion has a convex shape corresponding to the concave shape of the joining portion.

As another aspect of the present invention, a method of manufacturing a connector fixing structure, comprising the steps of: (a) preparing a housing integrally formed with a tubular resin housing-side insertion opening member protruding inward and a connector adapted to be provided in the housing and to be joined to the housing-side insertion opening member; (b) combining together the housing-side insertion opening member and a connector-side insertion opening member provided to the connector and having a shape corresponding to that of the housing-side insertion opening member; and (c) welding together the housing-side insertion opening member and the connector-side insertion opening member by melting a welding portion of the connector-side insertion opening member over its entire circumference is provided.

The step (c) may weld together the housing-side insertion opening member and the connector-side insertion opening member so that a housing-side through hole of the housing-side insertion opening member is opened through to the outside of the housing.

It is preferable that: the step (a) prepares the housing which is made of a resin that transmits heating laser light, and the connector at least the welding portion of which is made of a resin that absorbs the heating laser light; and the step (c) welds together the housing-side insertion opening member and the connector-side insertion opening member by irradiating the heating laser light to melt the welding portion of the connector-side insertion opening member over its entire circumference. In this case, it is preferable that: the step (a) prepares the housing in which the housing-side insertion opening member has at its end a joining portion having a concave shape, and the connector in which the welding portion has a convex shape corresponding to the concave shape of the joining portion; the step (b) inserts the welding portion having the convex shape into the joining portion having the concave shape; and the step (c) irradiates the heating laser light to the welding portion from the joining portion side.

Effect of the Invention

According to this invention, it is possible to provide a connector fixing structure which is capable of preventing the entry of water with a simpler structure than conventional ones.

MODE FOR CARRYING OUT THE INVENTION

Hereinbelow, a preferred embodiment of this invention will be described in detail with reference to the drawings.

First, referring to FIGS. 1 to 6, a connector fixing structure 100 according to this embodiment will be briefly described.

Herein, as the connector fixing structure 100, there is shown by way of example a fixing structure where a receptacle connector 3 into which an audio plug 210 as a mating connector is adapted to be inserted is fixed to a housing 1 of a smartphone.

Figure 1:
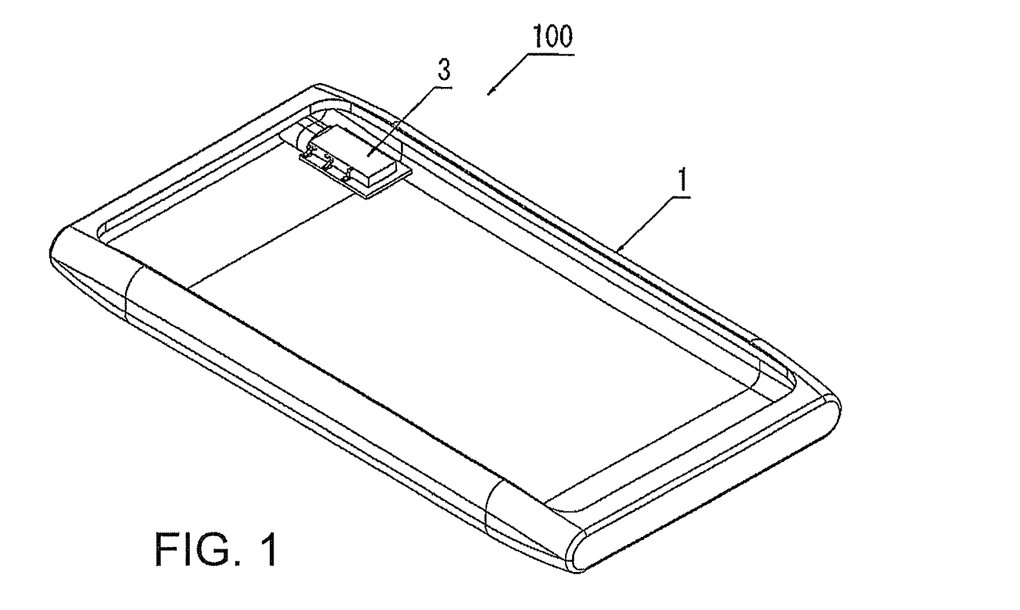
FIG. 1 is a perspective view showing a connector fixing structure 100.
Figure 2:
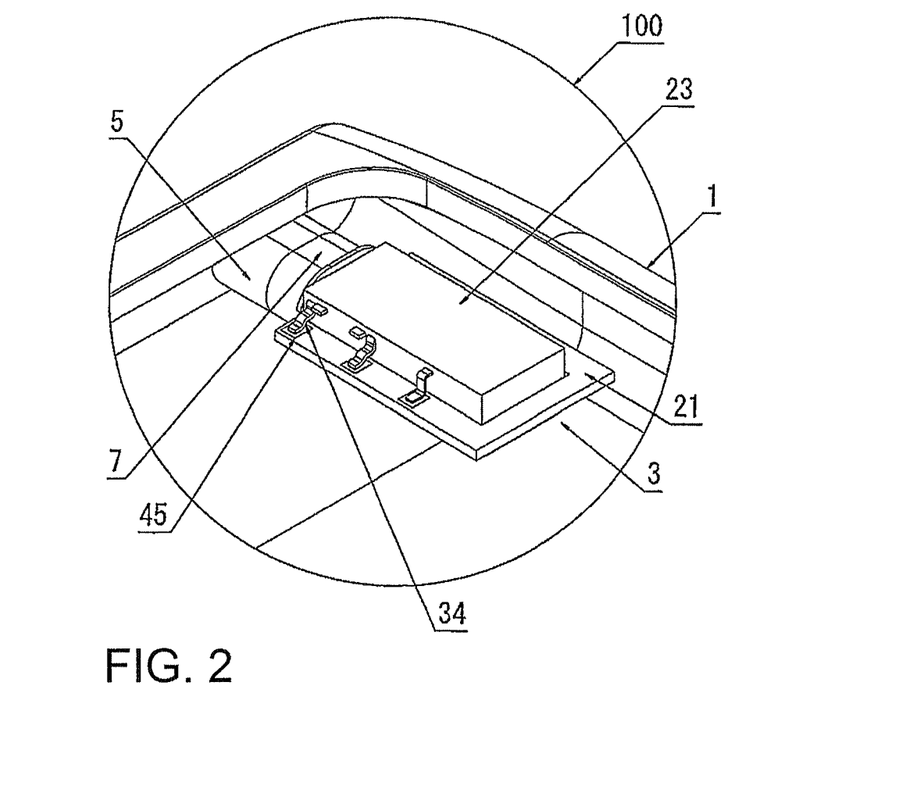
FIG. 2 is an enlarged view, showing a receptacle connector 3 and its neighboring portion, of FIG. 1.

As shown in FIGS. 1 and 2, the connector fixing structure 100 comprises the housing 1 and the receptacle connector 3.

Figure 3:
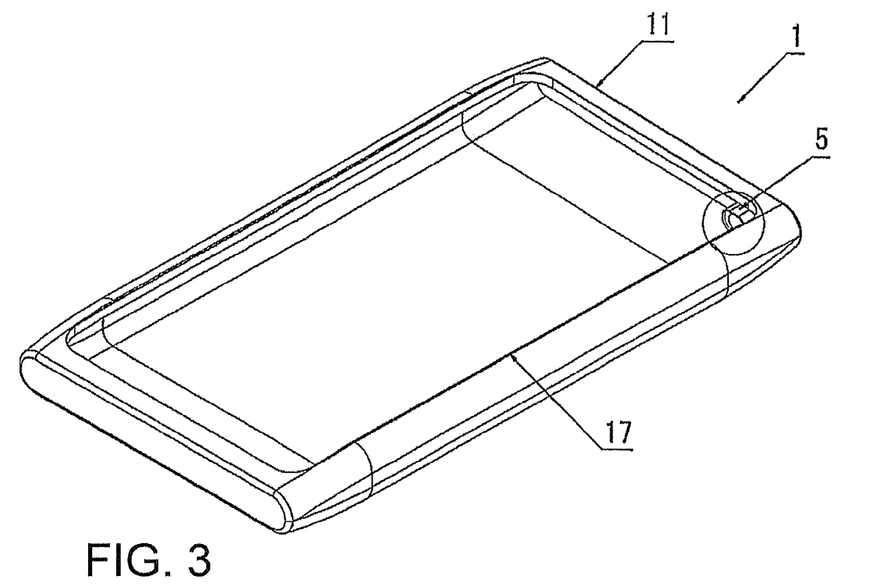
FIG. 3 is a perspective view showing a housing 1.
Figure 4:
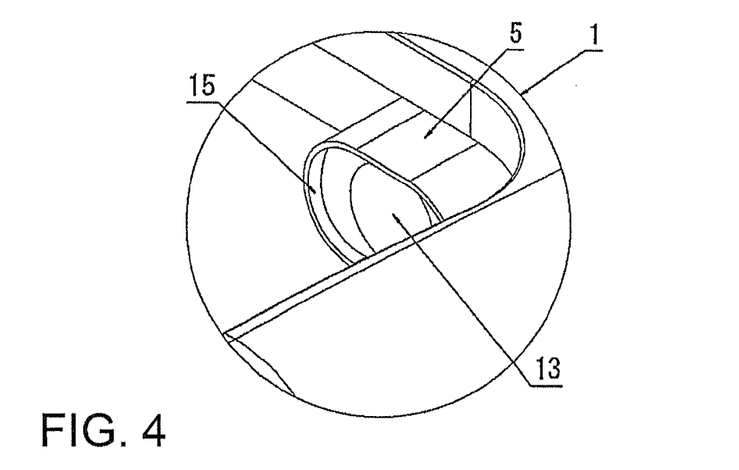
FIG. 4 is an enlarged view, showing a housing-side insertion opening member 5 and its neighboring portion, of FIG. 3.
Figure 5:
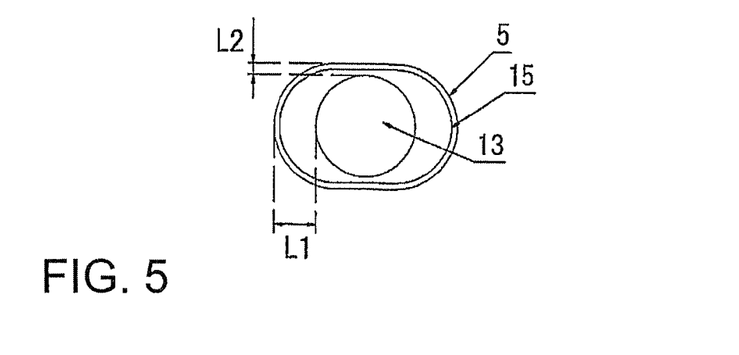
FIG. 5 is a front view of the housing-side insertion opening member 5.

More specifically, as shown in FIGS. 3 to 5, the housing 1 is integrally formed with a tubular resin housing-side insertion opening member 5 protruding inward and, as shown in FIGS. 1 and 2, the receptacle connector 3 is provided in the housing 1 and joined to the housing-side insertion opening member 5.

Figure 6:
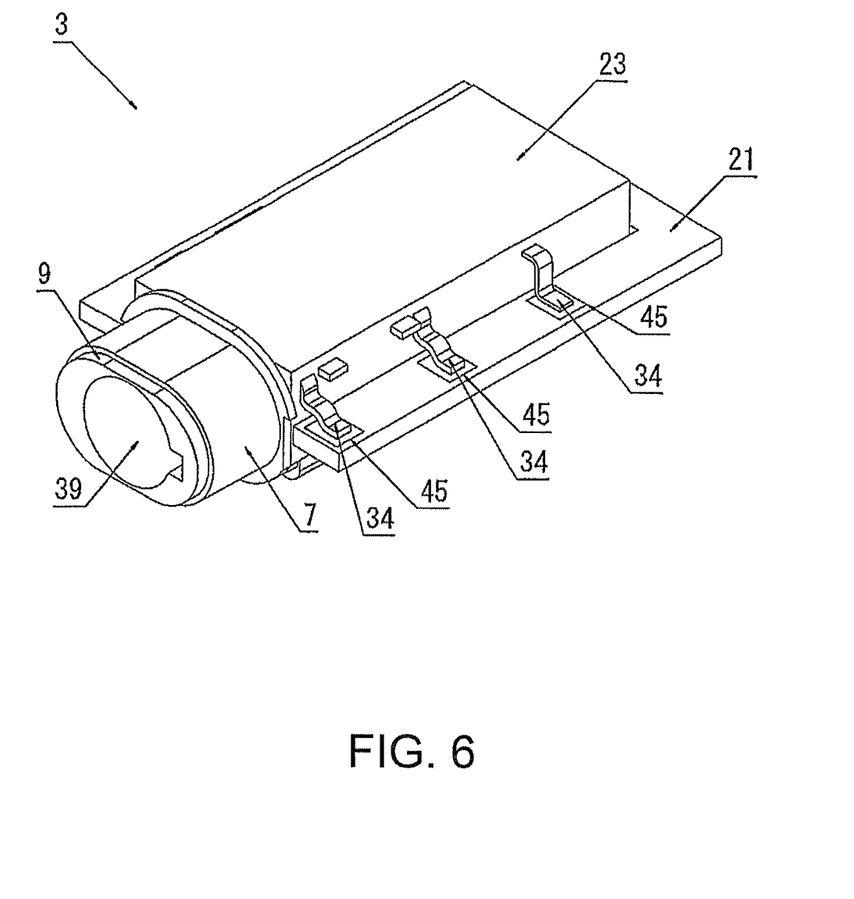
FIG. 6 is a perspective view of the receptacle connector 3.

As shown in FIG. 6, the receptacle connector 3 has a connector-side insertion opening member 7 having a shape corresponding to that of the housing-side insertion opening member 5 and a resin welding portion 9 provided to the connector-side insertion opening member 7 and adapted to be combined with the housing-side insertion opening member 5.

Although details will be described later, in the connector fixing structure 100, the connector-side insertion opening member 7 is welded to the housing-side insertion opening member 5 by melting the welding portion 9 over its entire circumference (in this embodiment, surfaces of the welding portion 9 and the housing-side insertion opening member 5 are melted together to be integrated with each other with no gap therebetween).

Next, the respective members forming the connector fixing structure 100 will be described in more detail.

First, the structure of the housing 1 will be described with reference to FIGS. 3 to 5.

As shown in FIG. 3, the housing 1 has a box-shaped body 11 and the box-shaped body 11 forms an opening portion 17 whose front surface is partially opened.

The opening portion 17 is opened for incorporating non-illustrated electronic components forming the smartphone and the receptacle connector 3 and is a portion where a display portion such as a liquid crystal display portion is fitted.

As shown in FIGS. 3 to 5, the body 11 is provided at a part of its upper surface with the tubular resin housing-side insertion opening member 5 protruding inward.

Herein, the term "tubular" represents not only a hollow circular cylindrical shape, but also a hollow rectangular parallelepiped shape.

As shown in FIG. 5, the housing-side insertion opening member 5 has an oval (track-like) front shape and is formed at its center with a housing-side through hole 13 having a shape corresponding to that of the later-described audio plug 210, i.e. having a round hole shape in this embodiment. The audio plug 210 is adapted to be inserted into the housing-side through hole 13.

As shown in FIG. 5, the thickness of the housing-side insertion opening member 5 is set such that a thickness L2 in a height direction is smaller than a thickness L1 in a width direction.

By setting the thickness L1 in the width direction to be large, the strength of the housing-side insertion opening member 5 can be ensured without setting the thickness L2 in the height direction to be large and therefore it is possible to achieve a reduction in height simultaneously with ensuring the strength.

The housing-side insertion opening member 5 is not provided with a member, such as a cover, closing the housing-side through hole 13 so that the housing-side through hole 13 is opened through from the inside to the outside of the housing 1.

As shown in FIGS. 4 and 5, the housing-side insertion opening member 5 has, at its end in a protruding direction toward the inside of the housing 1, a concave joining portion 15 having an annular shape which is thinner than the other part of the housing-side insertion opening member 5.

Although details will be described later, the joining portion 15 is a portion into which the welding portion 9 (connector-side insertion opening member 7) of the receptacle connector 3 is inserted.

Next, the structure of the receptacle connector 3 will be described with reference to FIGS. 6 to 14.

As shown in FIG. 6, the receptacle connector 3 comprises a substrate 21, a box-shaped insulator 23 mounted on the substrate 21, and the connector-side insertion opening member 7 provided at one surface of the insulator 23 and adapted to be joined to the housing-side insertion opening member 5 of the housing 1.

Figure 7:
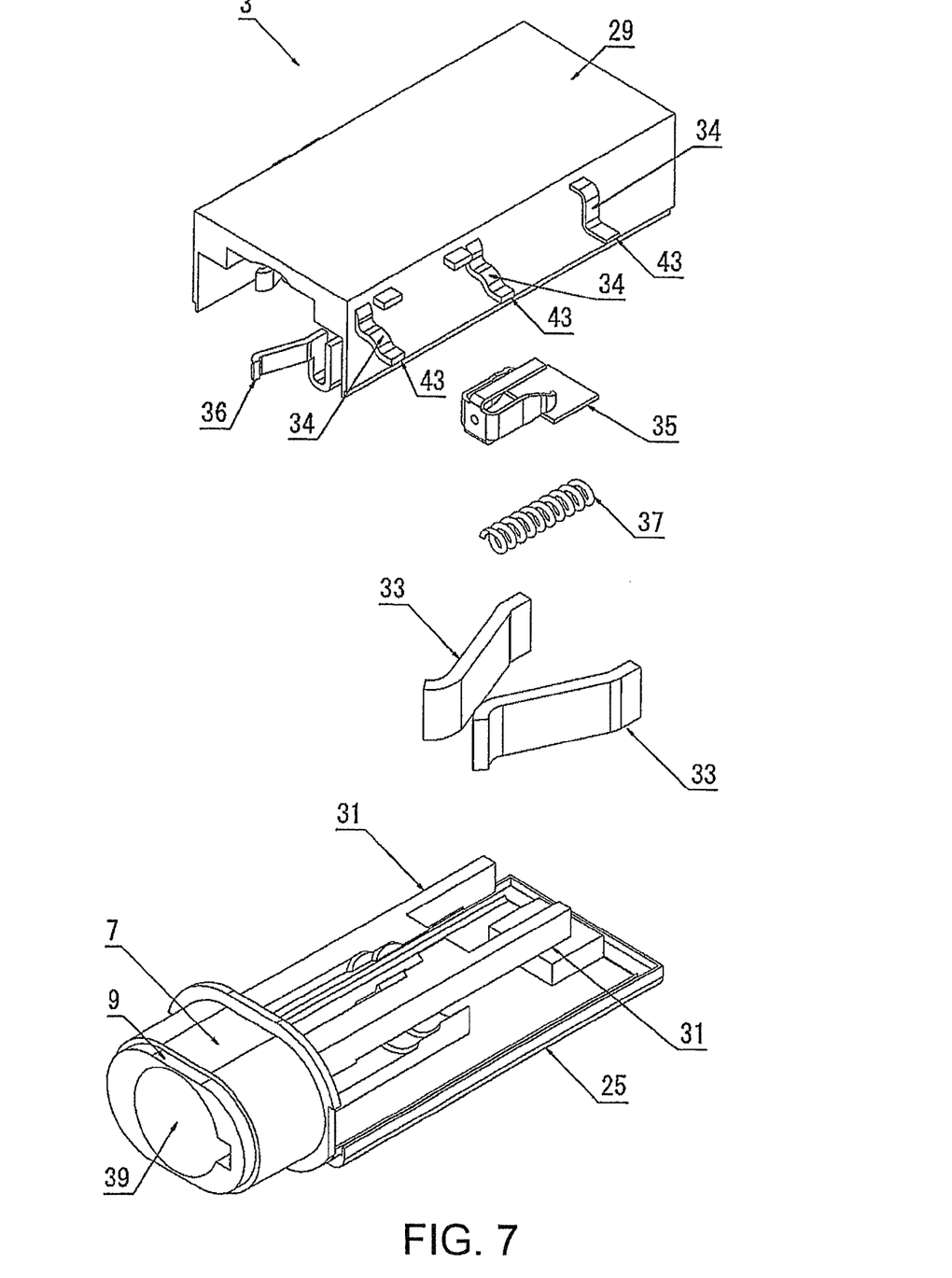
FIG. 7 is an exploded view of the receptacle connector 3, wherein the illustration of a substrate 21 is omitted.

More specifically, as shown in FIG. 7, the insulator 23 comprises a base insulator 25 forming a bottom portion of the box and a cover insulator 29 combined with the base insulator 25 and forming side portions and an upper portion of the box.

Figure 14:
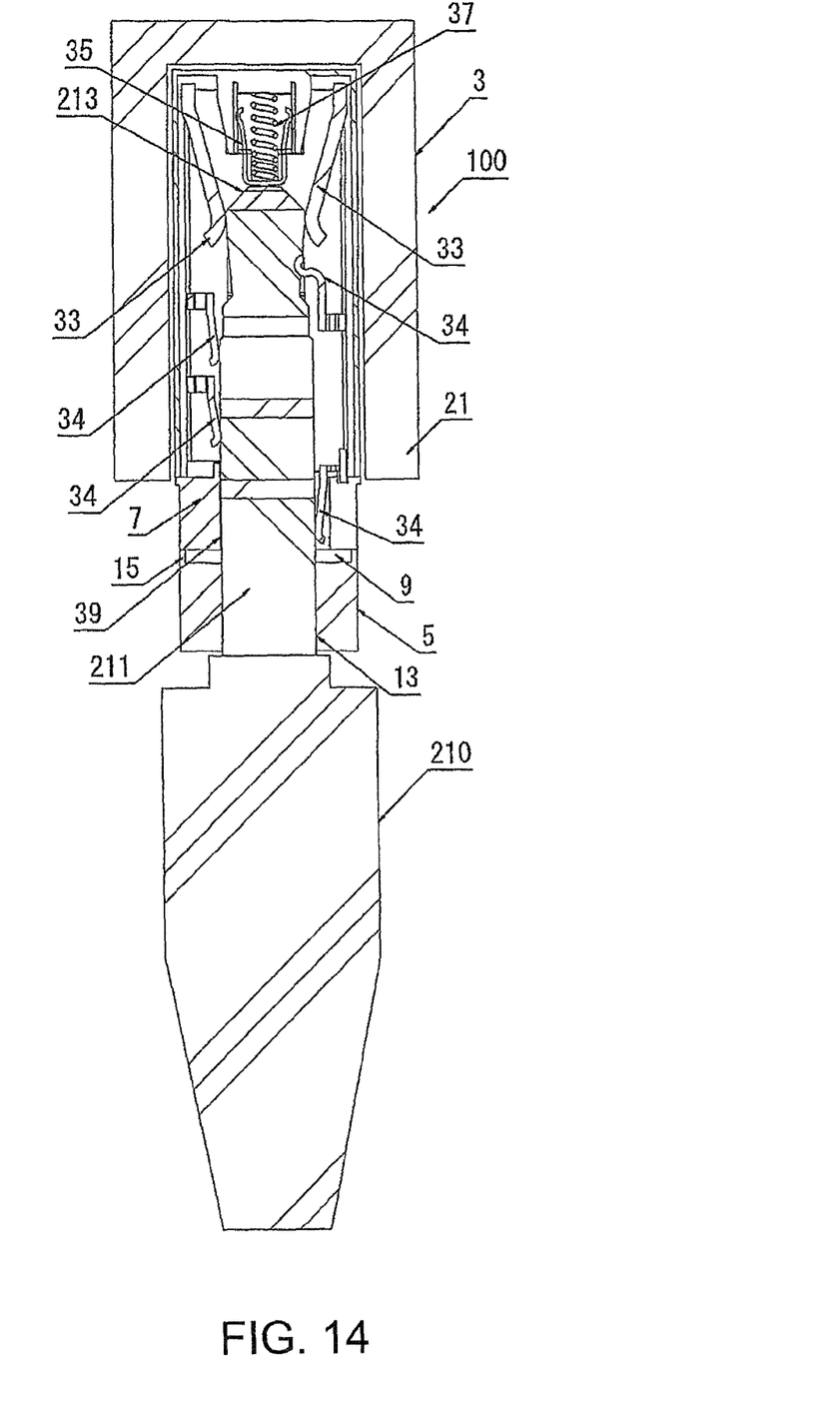
FIG. 14 is a cross-sectional view showing a state where the receptacle connector 3 of the connector fixing structure 100 and an audio plug 210 are combined together, wherein the illustration of a body 11 of the housing 1 is omitted.

The base insulator 25 is provided with columnar guide portions 31 which form a space into which the audio plug 210 is adapted to be inserted (see FIG. 14). Behind the guide portions 31, there are provided a pair of plate-like locking portions 33 adapted to hold the audio plug 210 by sandwiching it, a contact portion 35 serving as a stopper against which the tip of the audio plug 210 is adapted to abut, and a spring 37 which urges the contact portion 35 in a direction opposite to an insertion direction of the audio plug 210.

As shown in FIGS. 7 to 13, the cover insulator 29 is integrally formed with a plurality of contacts 34 so as to surround the guide portions 31.

Figure 13:
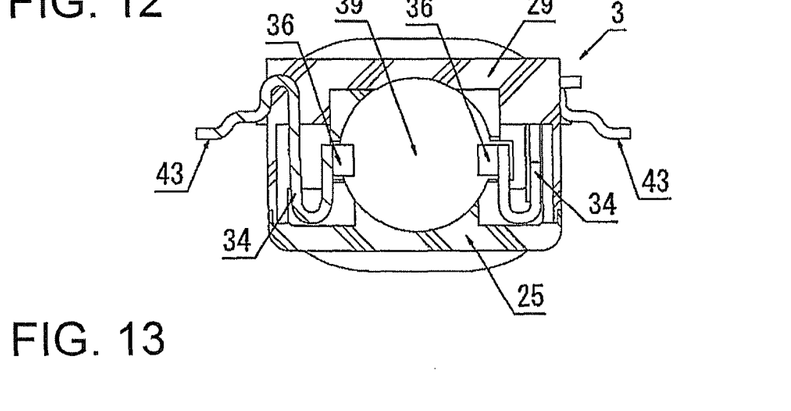
FIG. 13 is a C-C cross-sectional view of FIG. 11.

Each contact 34 is a member for establishing electrical connection between the audio plug 210 and the receptacle connector 3. As shown in FIG. 13, each contact 34 has one end which forms a contact portion 36 for contact with the audio plug 210 and the other end which forms a mounting portion 43 exposed to the outside of the cover insulator 29 and adapted to be connected to a corresponding one of contacts 45 of the substrate 21 by soldering or the like.

On the other hand, as described before, the connector-side insertion opening member 7 has a shape corresponding to that of the housing-side insertion opening member 5.

Figure 8:
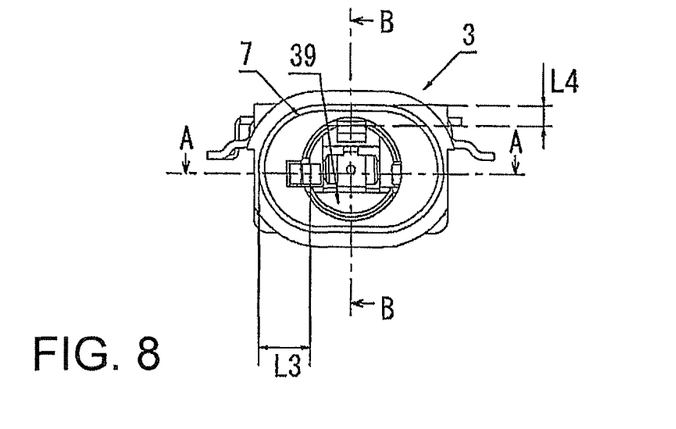
FIG. 8 is a front view of the receptacle connector 3, wherein the illustration of the substrate 21 is omitted.
Figure 9:
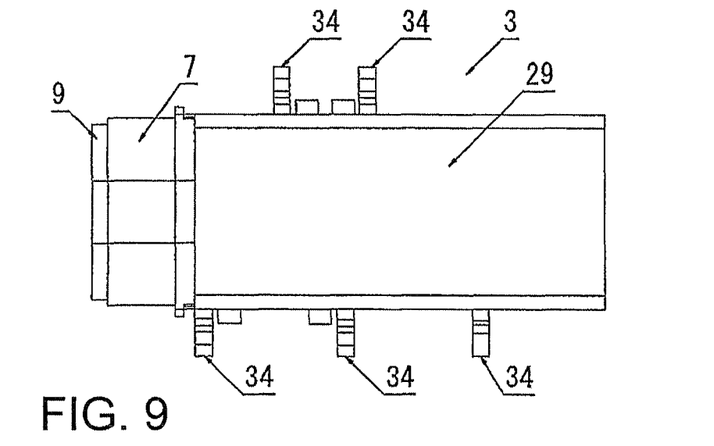
FIG. 9 is a plan view of the receptacle connector 3, wherein the illustration of the substrate 21 is omitted.
Figure 10:
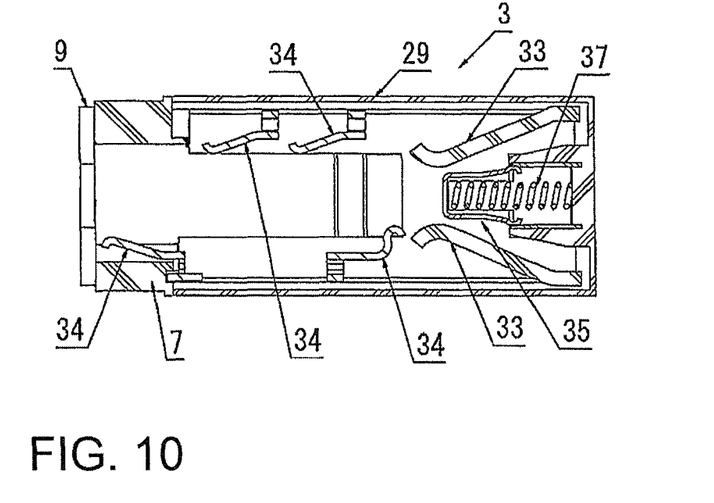
FIG. 10 is an A-A cross-sectional view of FIG. 8.

Specifically, as shown in FIG. 8, the connector-side insertion opening member 7 has an oval (track-like) front shape and is formed at its center with a connector-side through hole 39 having a shape corresponding to that of the audio plug 210, i.e. having a round hole shape in this embodiment. The audio plug 210 is adapted to be inserted into the connector-side through hole 39.

As shown in FIG. 8, the thickness of the connector-side insertion opening member 7 is set such that a thickness L4 in a height direction is smaller than a thickness L3 in a width direction.

By setting the thickness L3 in the width direction to be large, the strength of the connector-side insertion opening member 7 can be ensured without setting the thickness L4 in the height direction to be large and therefore it is possible to achieve a reduction in height simultaneously with ensuring the strength.

Figure 11:
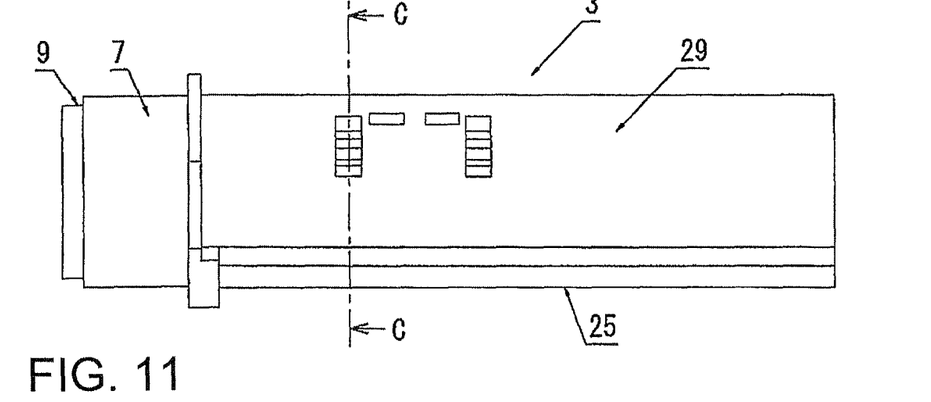
FIG. 11 is a side view of the receptacle connector 3, wherein the illustration of the substrate 21 is omitted.
Figure 12:
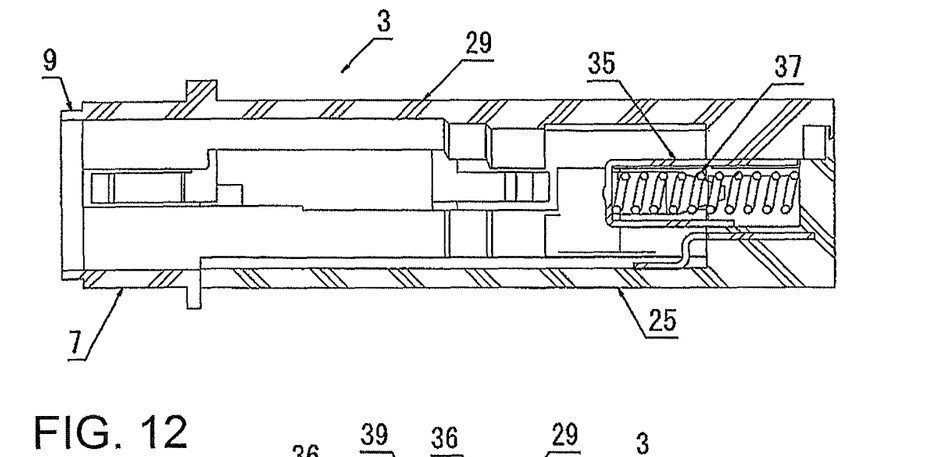
FIG. 12 is a B-B cross-sectional view of FIG. 8.

On the other hand, an end portion of the connector-side insertion opening member 7 has a shape corresponding to that of the joining portion 15 of the housing-side insertion opening member 5 and forms the welding portion 9. Specifically, as shown in FIGS. 11 and 12, the welding portion 9 has a convex (boss-like) shape which is thinner than the other part of the connector-side insertion opening member 7 by the thickness of the joining portion 15, and is inserted into the joining portion 15 of the housing-side insertion opening member 5.

Further, the welding portion 9 is welded to the joining portion 15 over its entire circumference, thereby forming a waterproof structure.

A welding method is not particularly limited as long as it is a method that can melt the welding portion 9. As a specific welding method, use may be made of, for example, laser welding or ultrasonic welding, but not necessarily limited thereto.

The type of laser is also not particularly limited and use may be made of a YAG (Yttrium Aluminum Garnet) laser, a laser diode, or the like.

When carrying out laser welding, it is necessary that the housing 1 be made of a resin that transmits heating laser light and that at least the welding portion 9 of the receptacle connector 3 be made of a resin that absorbs the heating laser light.

As the resin that transmits the heating laser light, there can be cited by way of example an amorphous resin or a crystalline resin, but not necessarily limited thereto. In the case where the resin that transmits the heating laser light is colored, if the coloring is carried out using a dye coloring material, the heating laser light can be transmitted even in a colored state.

On the other hand, as the resin that absorbs the heating laser light, there can be cited by way of example a resin using a coloring matter (black or the like) excellent in laser absorbency. A coloring material is preferably a combination of a pigment absorbing coloring matter and a dye absorbing coloring matter.

As described above, in the connector fixing structure 100, since the housing 1 and the receptacle connector 3 are joined together by welding to form the waterproof structure, no seal member is required.

Consequently, the connector fixing structure 100 can form the waterproof structure with the simple structure with no seal member and thus it becomes easy to reduce the size and thickness of the connector fixing structure 100.

Further, since the housing 1 and the receptacle connector 3 can be assembled together only by inserting the welding portion 9 into the joining portion 15 and welding them together, components and man-hours for holding the seal member are not required compared to the case where the seal member is used.

Accordingly, it is possible to simplify the assembly sequence and to reduce the manufacturing cost.

Further, since the connector fixing structure 100 can be assembled only by welding the welding portion 9 to the joining portion 15, the waterproof structure can be formed without mechanically deforming the housing-side insertion opening member 5.

Consequently, the restriction to the shape and position of the housing-side insertion opening member 5 is small and thus the degree of design freedom is large compared to the case where the seal member is provided.

As described before, the audio plug 210 is adapted to be inserted as a mating connector into the connector fixing structure 100. Accordingly, the insertion sequence of the audio plug 210 will be briefly described with reference to FIG. 14.

First, a pin-shaped terminal 211 of the audio plug 210 is inserted through the housing-side through hole 13 of the housing-side insertion opening member 5 and through the connector-side through hole 39 of the connector-side insertion opening member 7 so that a tip portion 213 of the terminal 211 is brought into abutment with the contact portion 35.

When the terminal 211 is further inserted against a repulsive force of the spring 37, the tip portion 213 is sandwiched between the locking portions 33 so that the audio plug 210 is fixed.

In this state, the contacts 34 are in contact with a peripheral surface of the terminal 211 so that the audio plug 210 and the contacts 34 are electrically connected together.

The foregoing is the insertion sequence of the audio plug 210.

Next, a method of manufacturing the connector fixing structure 100 will be briefly described with reference to FIGS. 3, 6, 7, and 15 to 17.

First, the housing 1 shown in FIG. 3 and the receptacle connector 3 shown in FIG. 6 are prepared.

The receptacle connector 3 is assembled, for example, in the following sequence.

First, the contact portion 35 with the spring 37 incorporated therein is attached to the base insulator 25 and, further, the locking portions 33 are attached to the base insulator 25.

Then, as shown in FIG. 7, the connector-side insertion opening member 7 is joined to the base insulator 25.

A joining method between the base insulator 25 and the connector-side insertion opening member 7 is, for example, welding, but not necessarily limited thereto.

Then, as shown in FIG. 7, the cover insulator 29 and the contacts 34 are integrally formed together. Then, the base insulator 25 and the cover insulator 29 are combined together, thereby forming the insulator 23.

Finally, as shown in FIG. 6, the mounting portions 43 of the contacts 34 are connected to the contacts 45 of the substrate 21 by soldering or the like, thereby completing the receptacle connector 3.

Figure 15:
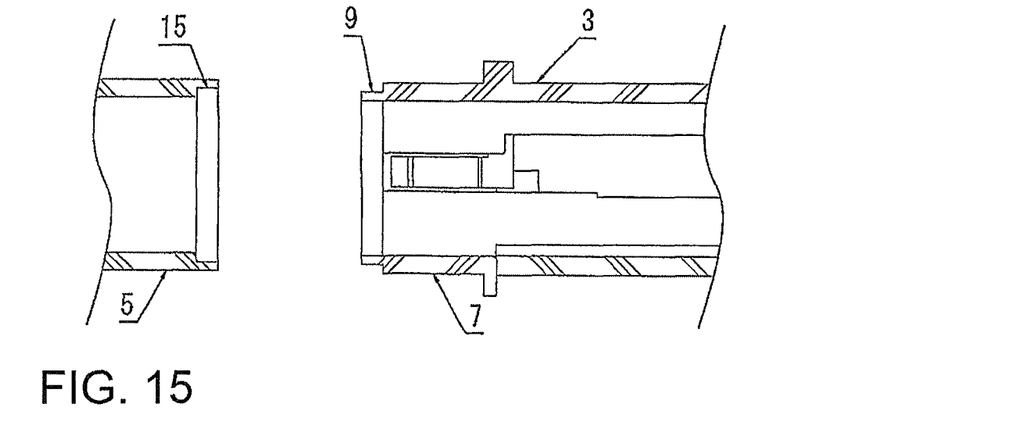
FIG. 15 is a diagram showing a process of manufacturing the connector fixing structure 100.
Figure 16:
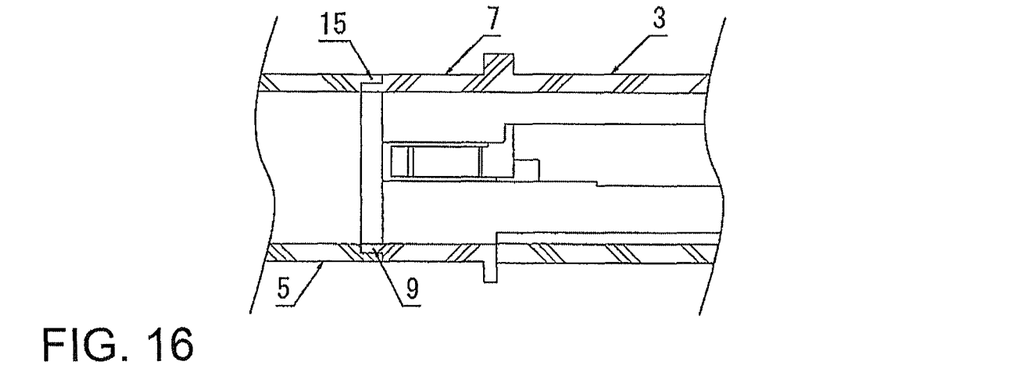
FIG. 16 is a diagram showing a process of manufacturing the connector fixing structure 100.

Then, the receptacle connector 3 and the housing 1 are combined together. Specifically, first, as shown in FIG. 15, the welding portion 9 of the connector-side insertion opening member 7 is aligned with the joining portion 15 of the housing-side insertion opening member 5 and, as shown in FIG. 16, the welding portion 9 is inserted into the joining portion 15.

Figure 17:
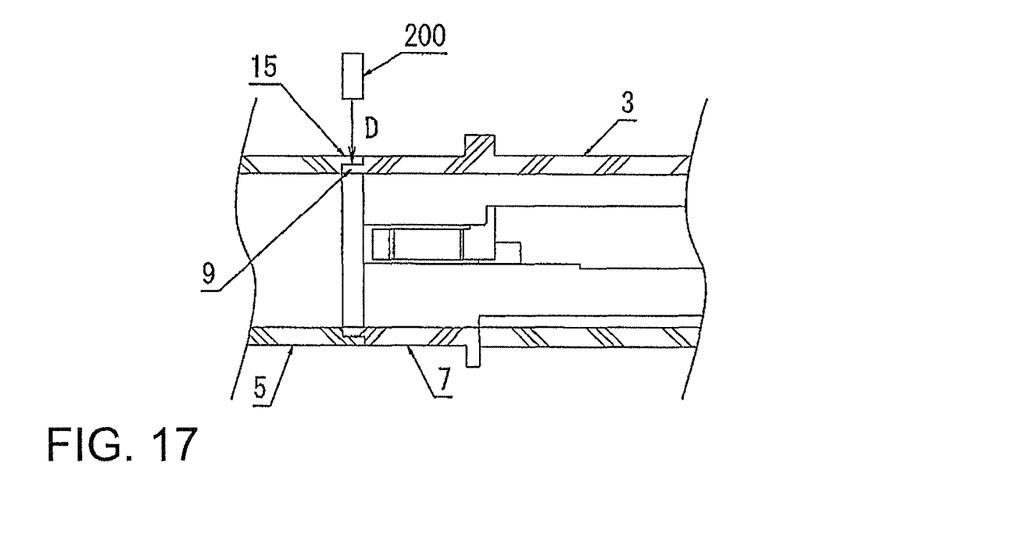
FIG. 17 is a diagram showing a process of manufacturing the connector fixing structure 100.

Then, as shown in FIG. 17, laser light (arrow D in FIG. 17) is irradiated to the welding portion 9 from the joining portion 15 side using a laser 200.

In this event, as described before, while the joining portion 15 of the housing-side insertion opening member 5 transmits the laser light, the welding portion 9 of the connector-side insertion opening member 7 absorbs the laser light. Consequently, the irradiated laser light passes through the joining portion 15 to heat and melt the welding portion 9.

The melted welding portion 9 is welded to the joining portion 15 so that the joining portion 15 and the welding portion 9 are joined together.

Further, by irradiating the laser light to the welding portion 9 over its entire circumference, the entire periphery of the welding portion 9 is welded to the joining portion 15 so that the joining portion 15 and the welding portion 9 form a waterproof structure.

Since the housing-side insertion opening member 5 is not deformed during the welding, the shape of the housing-side through hole 13 is also not deformed.

Therefore, the joining portion 15 and the welding portion 9 are joined together without deformation or closing of the housing-side through hole 13. The foregoing is the method of manufacturing the connector fixing structure 100.

As described above, according to this embodiment, the connector fixing structure 100 comprises the housing 1 integrally formed with the tubular resin housing-side insertion opening member 5 protruding inward and the receptacle connector 3 provided in the housing 1 and joined to the housing-side insertion opening member 5, wherein the receptacle connector 3 has the connector-side insertion opening member 7 having the shape corresponding to that of the housing-side insertion opening member 5 and the resin welding portion 9 provided to the connector-side insertion opening member 7 and combined with the housing-side insertion opening member 5 and wherein the housing-side insertion opening member 5 and the connector-side insertion opening member 7 are welded together by melting the welding portion 9 over its entire circumference.

Therefore, the connector fixing structure 100 requires no seal member and thus can form the waterproof structure with the simple structure.

Further, since the housing 1 and the receptacle connector 3 can be assembled together only by inserting the welding portion 9 into the joining portion 15 and welding them together, components and man-hours for holding the seal member are not required compared to the case where the seal member is used.

Accordingly, it is possible to simplify the assembly sequence and to reduce the manufacturing cost.

Further, since the connector fixing structure 100 can be assembled only by welding the welding portion 9 to the joining portion 15, the waterproof structure can be formed without mechanically deforming the housing-side insertion opening member 5.

Consequently, the restriction to the shape and position of the housing-side insertion opening member 5 is small and thus the degree of design freedom is large compared to the case where the seal member is provided.

Further, the thickness L1 in the width direction is set to be greater than the thickness L2 in the height direction in the housing-side insertion opening member 5, thereby ensuring the strength of the housing-side insertion opening member 5 by its thickness in the width direction. Likewise, the thickness L3 in the width direction is set to be greater than the thickness L4 in the height direction in the connector-side insertion opening member 7, thereby ensuring the strength of the connector-side insertion opening member 7 by its thickness in the width direction.

Consequently, it is possible to easily achieve a reduction in the height of the housing-side insertion opening member 5 and the connector-side insertion opening member 7.

While the preferred embodiment of this invention has been described with reference to the accompanying drawings, this invention is not limited thereto. It is apparent that those skilled in the art can think of various changes and modifications in the category described in claims and it is understood that those also naturally belong to the technical scope of this invention.

For example, while the housing-side insertion opening member 5 and the connector-side insertion opening member 7 each have the oval front shape in the above-mentioned embodiment, it may have a rectangular front shape. Further, while, as the housing, the housing 1 of the smartphone is shown by way of example in the above-mentioned embodiment, the housing is not limited to the smartphone housing.

Further, while, as the connector, the receptacle connector 3 into which the audio plug 210 is adapted to be inserted is shown by way of example in the above-mentioned embodiment, the connector is not limited to that for the audio plug 210 and also not limited to the receptacle connector.

What is claimed is:

1. A connector fixing structure comprising:
   a housing integrally formed with a tubular resin housing-side insertion opening member protruding inward; and
   a connector provided in the housing and joined to the housing-side insertion opening member,
   wherein the connector comprises:
   a connector-side insertion opening member having a shape corresponding to that of the housing-side insertion opening member; and
   a resin welding portion provided to the connector-side insertion opening member and combined with the housing-side insertion opening member, and
   wherein the housing-side insertion opening member and the connector-side insertion opening member are welded together by melting the welding portion over its entire circumference.

2. The connector fixing structure according to claim 1, wherein the housing-side insertion opening member has a housing-side through hole which is opened through to the outside of the housing and into which a mating connector is adapted to be inserted.

3. The connector fixing structure according to claim 1,
   wherein the welding portion is heated and melted by irradiation of heating laser light,
   wherein the housing is made of a resin that transmits the heating laser light, and
   wherein at least the welding portion of the connector is made of a resin that absorbs the heating laser light.

4. The connector fixing structure according to claim 2, wherein the housing-side insertion opening member is such that its thickness in a height direction is smaller than its thickness in a width direction.

5. The connector fixing structure according to claim 4, wherein the housing-side through hole has a circular front shape and the housing-side insertion opening member has an oval front shape.

6. The connector fixing structure according to claim 1, wherein the connector-side insertion opening member is such that its thickness in a height direction is smaller than its thickness in a width direction.

7. The connector fixing structure according to claim 6,
   wherein the connector-side insertion opening member has a connector-side through hole into which the mating connector is adapted to be inserted, and
   wherein the connector-side through hole a circular front shape and the connector-side insertion opening member has an oval front shape.

8. The connector fixing structure according to claim 1,
   wherein the housing-side insertion opening member has at its end a joining portion having a concave shape, and
   wherein the welding portion has a convex shape corresponding to the concave shape of the joining portion.

9. A method of manufacturing a connector fixing structure, comprising the steps of:
   (a) preparing a housing integrally formed with a tubular resin housing-side insertion opening member protruding inward and a connector adapted to be provided in the housing and to be joined to the housing-side insertion opening member;
   (b) combining together the housing-side insertion opening member and a connector-side insertion opening member provided to the connector and having a shape corresponding to that of the housing-side insertion opening member; and
   (c) welding together the housing-side insertion opening member and the connector-side insertion opening member by melting a welding portion of the connector-side insertion opening member over its entire circumference.

10. The method according to claim 9, wherein the step (c) welds together the housing-side insertion opening member and the connector-side insertion opening member so that a housing-side through hole of the housing-side insertion opening member is opened through to the outside of the housing.

11. The method according to claim 9,
    wherein the step (a) prepares the housing which is made of a resin that transmits heating laser light, and the connector at least the welding portion of which is made of a resin that absorbs the heating laser light, and
    wherein the step (c) welds together the housing-side insertion opening member and the connector-side insertion opening member by irradiating the heating laser light to melt the welding portion of the connector-side insertion opening member over its entire circumference.

12. The method according to claim 11,
    wherein the step (a) prepares the housing in which the housing-side insertion opening member has at its end a joining portion having a concave shape, and the connector in which the welding portion has a convex shape corresponding to the concave shape of the joining portion,
    wherein the step (b) inserts the welding portion having the convex shape into the joining portion having the concave shape, and
    wherein the step (c) irradiates the heating laser light to the welding portion from the joining portion side.

* * * * *